(12) United States Patent
Todori et al.

(10) Patent No.: US 9,229,161 B2
(45) Date of Patent: Jan. 5, 2016

(54) WAVEGUIDE AND INTEGRATED CIRCUIT

(71) Applicants: Kenji Todori, Kanagawa-ken (JP); Yoshiaki Fukuzumi, Kanagawa-ken (JP); Hideaki Aochi, Kanagawa-ken (JP); Tsukasa Tada, Tokyo (JP); Ko Yamada, Kanagawa-ken (JP); Shigehiko Mori, Kanagawa-ken (JP); Naomi Shida, Tokyo (JP); Reiko Yoshimura, Kanagawa-ken (JP)

(72) Inventors: Kenji Todori, Kanagawa-ken (JP); Yoshiaki Fukuzumi, Kanagawa-ken (JP); Hideaki Aochi, Kanagawa-ken (JP); Tsukasa Tada, Tokyo (JP); Ko Yamada, Kanagawa-ken (JP); Shigehiko Mori, Kanagawa-ken (JP); Naomi Shida, Tokyo (JP); Reiko Yoshimura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 13/729,922

(22) Filed: Dec. 28, 2012

(65) Prior Publication Data

US 2013/0251306 A1    Sep. 26, 2013

(30) Foreign Application Priority Data

Mar. 26, 2012 (JP) ................................. 2012-069073

(51) Int. Cl.
| G02B 6/12 | (2006.01) |
| G02B 6/26 | (2006.01) |
| G02B 6/10 | (2006.01) |
| B82Y 20/00 | (2011.01) |
| G02B 6/122 | (2006.01) |
| G02B 6/125 | (2006.01) |

(52) U.S. Cl.
CPC . *G02B 6/12* (2013.01); *B82Y 20/00* (2013.01); *G02B 6/122* (2013.01); *G02B 6/125* (2013.01); *G02B 6/1223* (2013.01)

(58) Field of Classification Search
CPC ........ G02B 6/12; G02B 6/122; G02B 6/1223; G02B 6/125; B82Y 10/00; B82Y 20/00
USPC ........... 385/14, 15, 27, 31, 32, 33, 34, 38, 39, 385/42, 45, 50, 122, 129–132, 141–146; 977/700, 932
See application file for complete search history.

(56) References Cited

U.S. PATENT DOCUMENTS

| 2004/0095658 A1* | 5/2004 | Buretea et al. ................. 359/853 |
| 2014/0000704 A1* | 1/2014 | Farahi ............................ 136/257 |

FOREIGN PATENT DOCUMENTS

| JP | 2005-351941 |   | 12/2005 |  |
| JP | 2006-163188 A |   | 6/2006 |  |
| JP | 2006163188 | * | 6/2006 | ............... G02B 6/12 |
| JP | 2007-148289 A |   | 6/2007 |  |
| JP | 2007148289 | * | 6/2007 | ............... G02B 6/12 |

OTHER PUBLICATIONS

Office Action issued Jun. 11, 2014 in Japanese Patent Application No. 2012-069073 (with English language translation).
M. Quinten, et al., "Electromagnetic energy transport via linear chains of silver nanoparticles", Optics Letters, vol. 23, No. 17, Sep. 1, 1998, pp. 1331-1333.

\* cited by examiner

*Primary Examiner* — Akm Enayet Ullah
*Assistant Examiner* — Michael Mooney
(74) *Attorney, Agent, or Firm* — Oblon, McClelland, Maier & Neustadt, L.L.P.

(57) ABSTRACT

According to one embodiment, a waveguide includes: a substrate and a member. The member covers at least a part of the substrate and has a difference in the refractive index from the substrate not less than 2. A plurality of concave parts are provided on the substrate. The concave parts are arrayed on an upper face of the substrate. At least a part of a side face of each of the concave parts includes an arc. An inner diameter of each of the concave parts is not more than 50 nm. Intervals of the neighboring concave parts are not more than the inner diameter. The member fills the concave part.

22 Claims, 17 Drawing Sheets

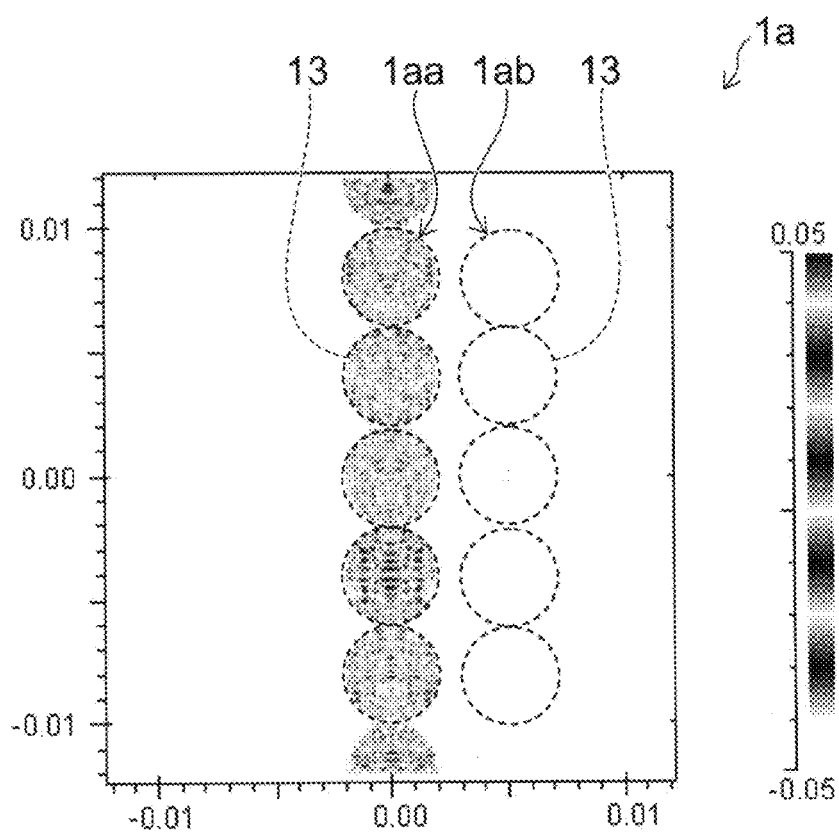
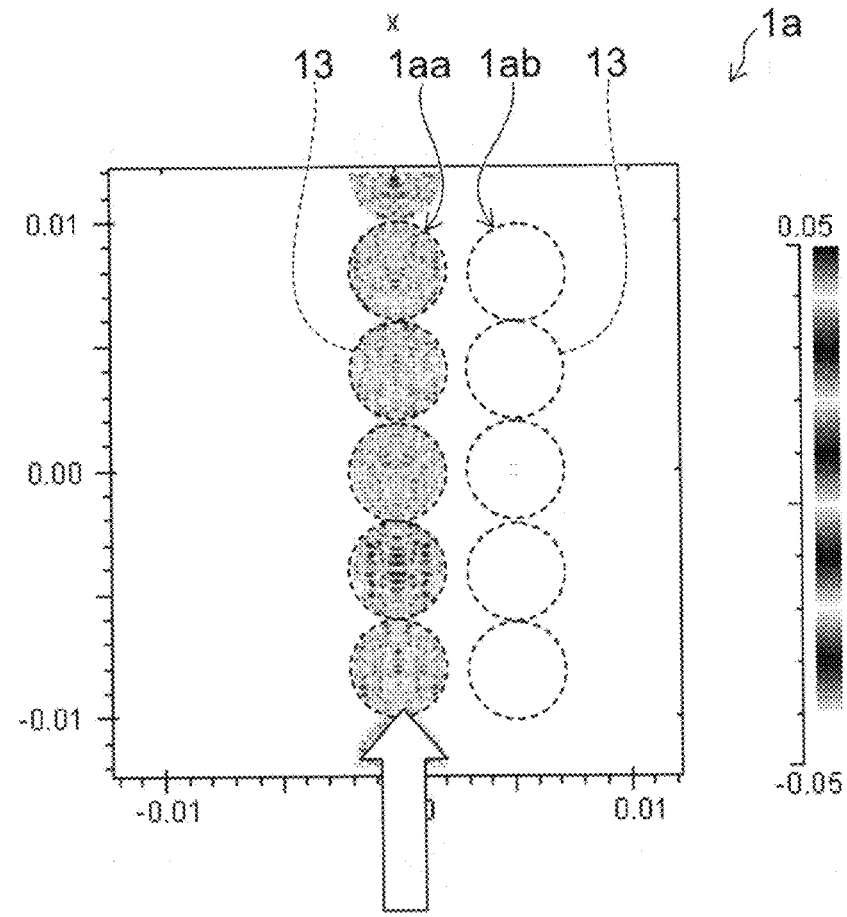

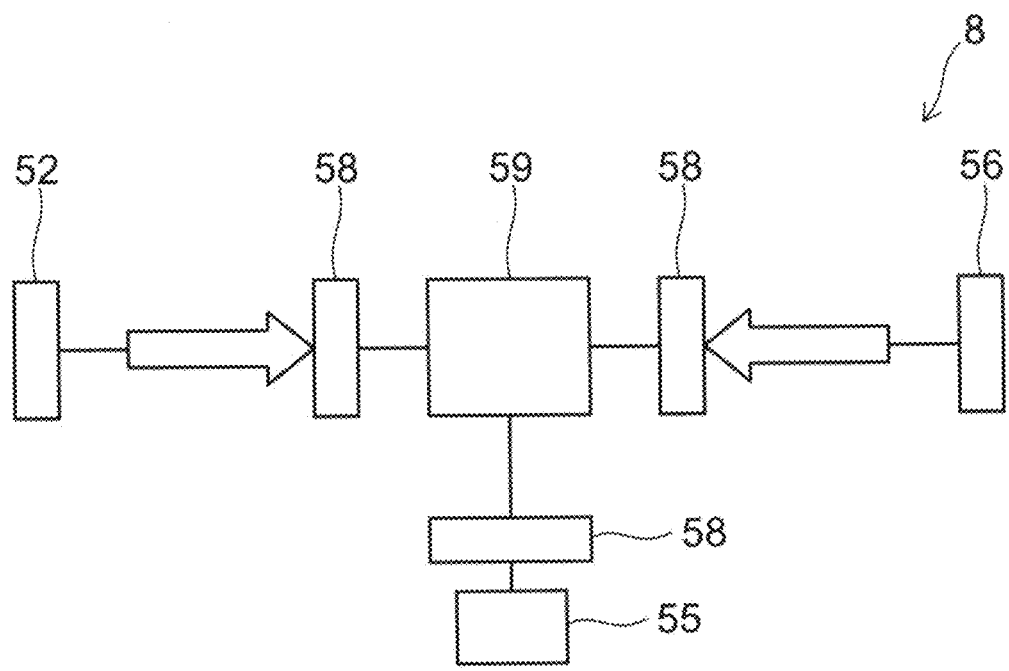
FIG. 20A
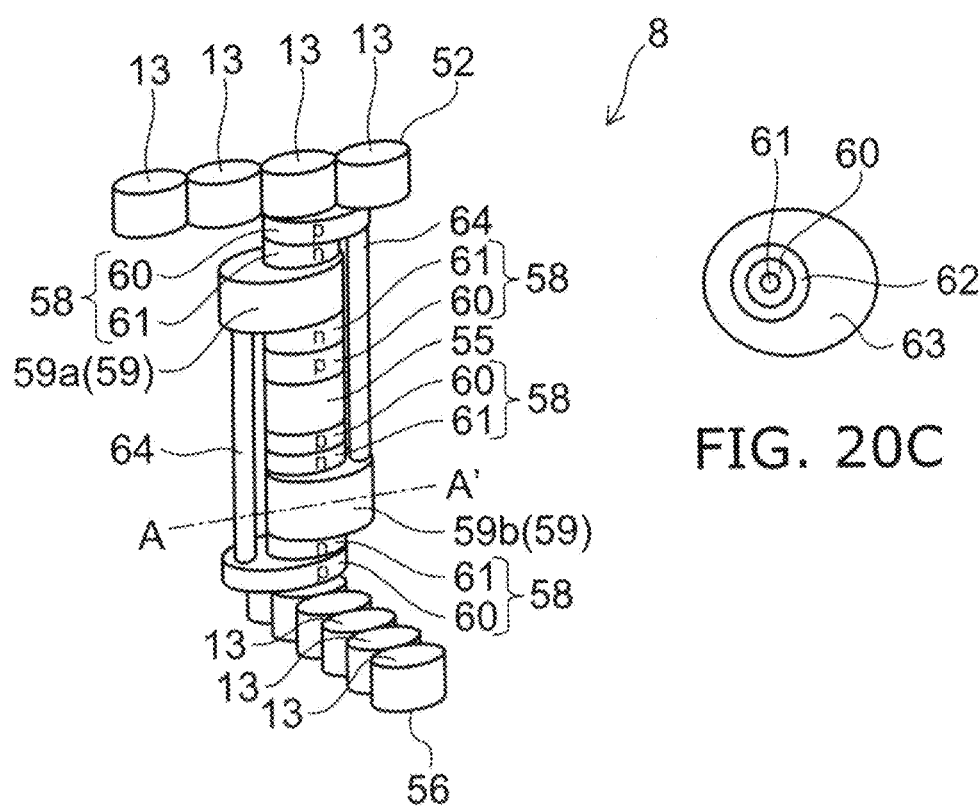
FIG. 20C
FIG. 20B

WAVEGUIDE AND INTEGRATED CIRCUIT

CROSS-REFERENCE TO RELATED APPLICATIONS

This application is based upon and claims the benefit of priority from the prior Japanese Patent Application No. 2012-069073, filed on Mar. 26, 2012; the entire contents of which are incorporated herein by reference.

FIELD

Embodiments described herein relate generally to a waveguide and an integrated circuit.

BACKGROUND

In order to further increase the integration of an LSI (large scale integrated circuit), it is necessary to make finer elements and metal wiring connecting elements. However, if the metal wiring is thinned down to not more than 10 nm, the specific resistance increases. An increase in specific resistance causes voltage drop of an element connected to the metal wiring. For example, voltage drop causes the voltage value applied to a gate electrode to vary. Consequently, in the generation of a pitch not more than 5 nm, new wiring is necessary in place of the metal wiring such as copper and aluminum.

BRIEF DESCRIPTION OF THE DRAWINGS

FIG. 6A is a plan view illustrating a distribution of an electric field;
FIG. 6B is a plan view illustrating a distribution of an electric field;
FIG. 20A is a block diagram illustrating an integrated circuit according to an eighth embodiment,
FIG. 20B is a perspective view illustrating the integrated circuit according to the eight embodiment;
FIG. 20C is a cross-sectional view by A-A' shown in FIG. 20B.

DETAILED DESCRIPTION

In general, according to one embodiment, a waveguide includes: a substrate; and a member covering at least a part of the substrate and having a difference in the refractive index from the substrate not less than 2, a plurality of concave parts being provided on the substrate, the concave parts being arrayed on an upper face of the substrate, at least a part of a side face of each of the concave parts including an arc, an inner diameter of each of the concave parts being not more than 50 nm, and intervals of the neighboring concave parts being not more than the inner diameter, and the member filling the concave part.

In general, according to another embodiment, a waveguide includes: a plurality of cylindrical bodies or spherical bodies, at least a part of a cross-section of each of the bodies including an arc, the bodies being arrayed on a face parallel to the cross-section, an outer diameter or diameter of each of the bodies being not more than 50 nm, and intervals of the neighboring bodies being not more than the outer diameter or the diameter; and a member covering at least a part of each of the bodies and having a difference in the refractive index from the bodies not less than 2.

In general, according to another embodiment, an integrated circuit includes: a waveguide including: a substrate; and a member covering at least a part of the substrate and having a difference in the refractive index from the substrate not less than 2, a plurality of concave parts being provided on the substrate, the concave parts being arrayed on an upper face of the substrate, at least a part of a side face of each of the concave parts including an arc, an inner diameter of each of the concave parts being not more than 50 nm, and intervals of the neighboring concave parts being not more than the inner diameter, and the member filling the concave part; and a storage unit connected to the waveguide.

Figure 1:
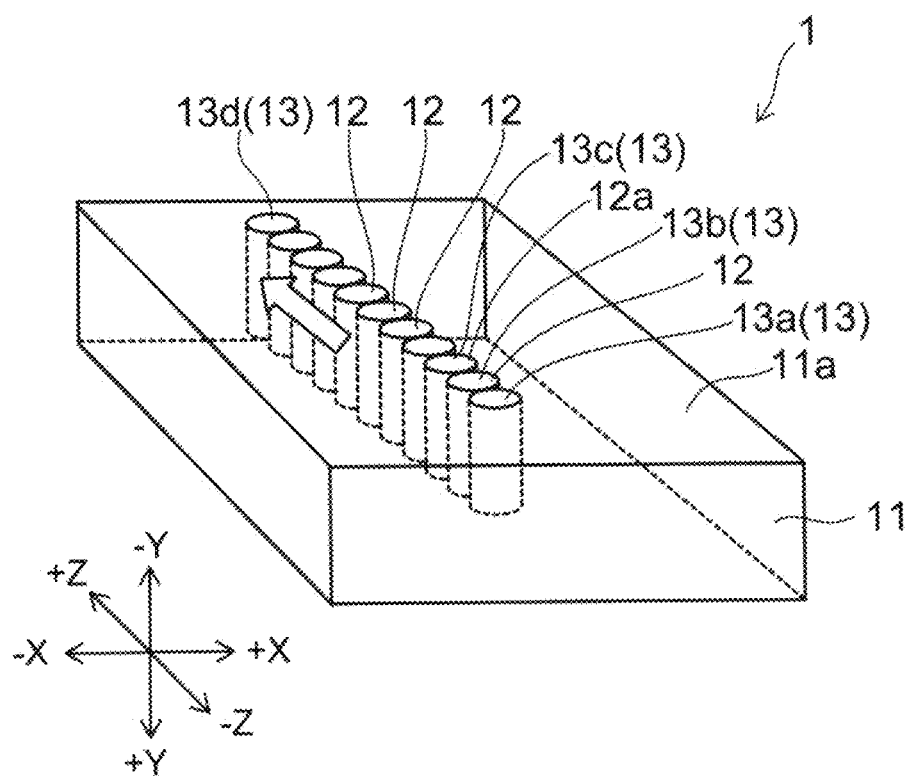
FIG. 1 is a perspective view illustrating a waveguide according to a first embodiment.

Hereinafter, embodiments of the invention will be explained with reference to the drawings.
(First Embodiment)
First, a first embodiment will be explained.
FIG. 1 is a perspective view illustrating a waveguide according to the first embodiment.

As shown in FIG. 1, a waveguide 1 according to the embodiment is provided with a substrate 11. The substrate 11 is, for example, a silicon (Si) substrate. The substrate 11 is provided with a plurality of concave parts 12. The plurality of the concave parts 12 are formed so as to be arrayed in one direction on an upper face 11a of the substrate 11.

Hereinafter, in the specification, in order to explain the waveguide 1, the XYZ-orthogonal coordinate system is adopted. In the XYZ-orthogonal coordinate system, one of the directions in which the concave parts 12 are arrayed on the upper face 11a of the substrate 11 is set to be a +Z direction and the opposite direction is set to be a −Z direction. On the upper face 11a of the substrate 11, one of the directions perpendicular to the +Z direction is set to be a +X direction and the opposite direction is set to be a −X direction. One of the directions perpendicular to both the X direction and the +Z direction is set to be a +Y direction and the opposite direction is set to be −Y direction. The thickness direction of the substrate 11 is set to be a Y direction. The "+X direction" and the "−X direction" are also generically referred to as an "X direction". The "+Y direction" and the "−Y direction" are also generically referred to as the "Y direction". The "+Z direction" and the "−Z direction" are also generically referred to as a "Z direction".

The plurality of the concave parts 12 are formed so as to be arrayed in the Z direction. An opening 12a of the concave part 12 is circular when viewed from above, that is, from the −Y direction. The concave part 12 is in a shape of a hole formed into the same inner diameter, downward from the opening 12a. Consequently, the cross-section of the concave part 12 parallel to the upper face 11a of the substrate 11 has also the same circular shape as the opening 12a. The side face of the concave part 12 includes an arc. The inner diameter of the concave part 12 is set to, for example, 50 to 0.1 nm, preferably 20 nm to 0.1 nm, and more preferably 10 nm to 0.1 nm, for example, 4 nm. The depth of the concave part 12 is set to 50 to 0.1 nm, preferably 20 nm to 0.1 nm, and more preferably 10 nm to 0.1 nm, for example, 4 nm. This is because the interaction between polarizations at interfaces at opposite positions of the concave part is also large and when the inner diameter is large, the electric field itself becomes weak. This is the same as the fact that the electric field is proportional to the magnitude of + and −charges and inversely proportional to the distance therebetween. Consequently, the electric field of the near-field light of the concave part having a large inner diameter becomes small and the propagation efficiency reduces. The plurality of the concave parts 12 are disposed so that the openings 12a come into contact with each other when viewed from above, that is, from the −Y direction.

The substrate 11 is covered with, for example, air. Consequently, the interior of the concave part 12 is filled with air. The air filled in the interior of the concave part 12 is referred to as an "air disc 13". Consequently, it can be said that in the waveguide 1, a plurality of the air discs 13 in the shape of a cylinder are arrayed in the Z direction. The cross-section of the air disc 13 is circular and includes an arc. The air discs 13 are arrayed on the face parallel to the cross-section. The interval between the neighboring air discs 13 is within the outer diameter. For example, the interval is 0, that is, the neighboring air discs 13 are in contact with each other.

The refractive index of silicon is 3.5 in the infrared region, which is a transparent wavelength region. In contrast, the refractive index of air is approximately 1. Consequently, the difference in the refractive index between the air disc 13 and the substrate 11 covering at least a part of the air disc 13 is not less than 2, for example, 2.5. Here, the refractive index indicates the real part of the refractive index.

Next, the operation of the embodiment will be explained.

Figure 2A:
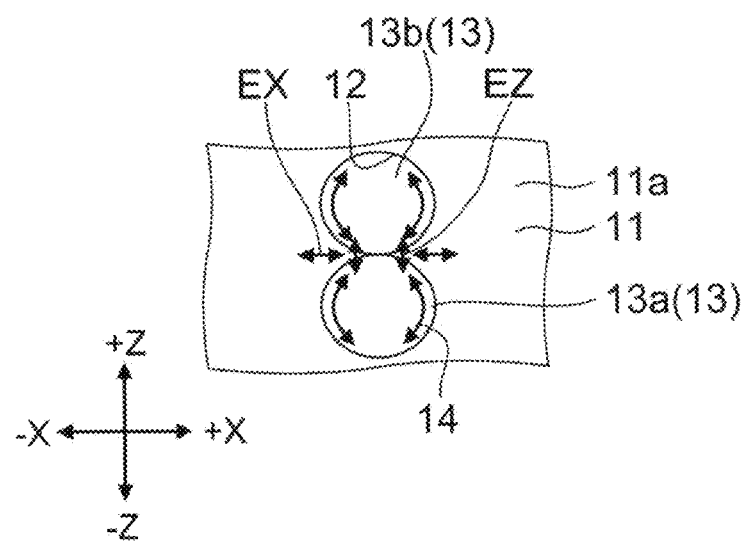
FIG. 2A is a plan view illustrating a waveguide according to the first embodiment.
Figure 2B:
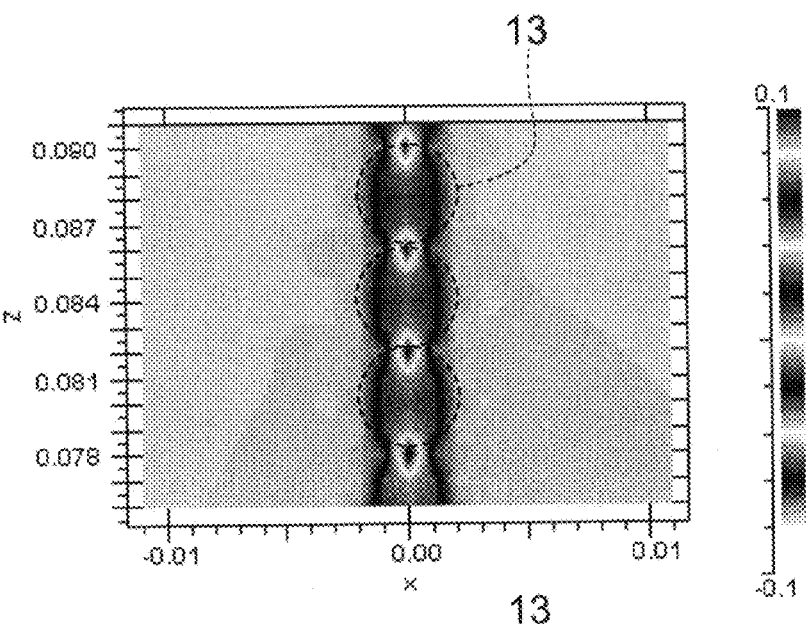
FIG. 2B is a plan view illustrating a distribution of an electric field.
Figure 2C:
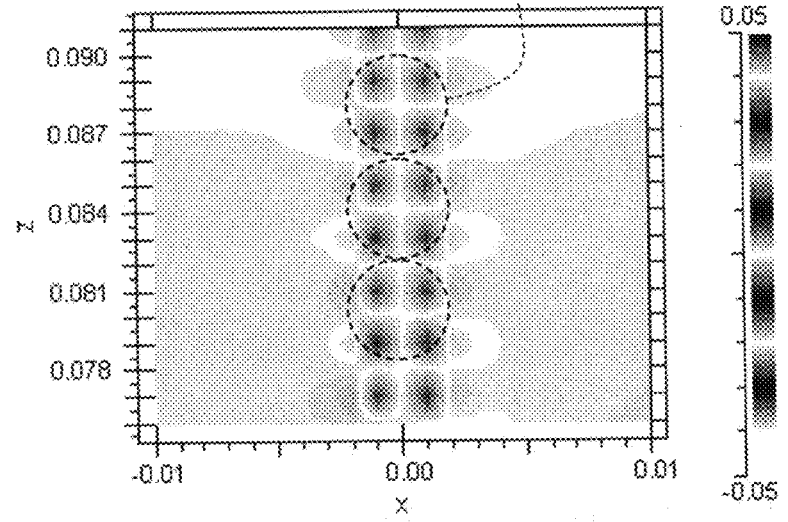
FIG. 2C is a plan view illustrating a distribution of an electric field.

FIG. 2A is a plan view illustrating a waveguide according to the first embodiment, FIG. 2B is a plan view illustrating a distribution of the electric field in the X direction when irradiation with single wavelength light is performed in the waveguide according to the first embodiment, wherein the horizontal axis represents a position in the X direction and the vertical axis represents a position in the Z direction, and FIG. 2C is a plan view illustrating a distribution of the electric field in the Z direction when irradiation with single wavelength light is performed in the waveguide according to the first embodiment, wherein the horizontal axis represents a position in the X direction and the vertical axis represents a position in the Z direction.

As shown in FIGS. 1 and 2A, when an air disc 13a disposed at one end of the waveguide 1 is irradiated with light having a wavelength longer than the outer diameter of the air disc 13, polarization of electrons is generated at the side face of the air disc 13a, that is, the side face of the concave part 12. The polarization generated vibrates at the same frequency as that of the frequency of the incident light at the side face of the concave part 12. Due to this, local near-field light is generated. The near-field light propagates only a short distance in the vicinity of the side face of the air disc 13. The near-field light includes an electric field 14. The electric field 14 includes an electric filed EX, the component in the X direction, and an electric field EZ, the component in the Z direction.

The near-field light generated in the air disc 13a causes an air disc 13b disposed adjacent to the air disc 13a to resonate in a whispering gallery mode or other modes at the side face of a cylindrical body 15. In this way, the near-field light propagates to the air disc 13b adjacent thereto and the near-field light is generated along the side face of the air disc 13b.

Next, the near-field light generated along the side face of the air disc 13b causes an air disc 13c disposed adjacent to the air disc 13b to resonate in a whispering gallery mode etc. In this way, by the fact that the near-field light propagates to the neighboring air disc 13 one after another, the near-field light propagates from the air disc 13a at one end of the waveguide 1 to an air disc 13d at the other end. The near-field light propagates in a waveguide manner when the incident light has a momentum in the traveling direction, or propagates in a diffusion manner when the incident light does not have a momentum.

As shown in FIGS. 2B and 2C, when the air disc 13 at one end of the waveguide is irradiated with single wavelength light, the electric field EX of the near-field light propagates the air disc 13 in the Z direction. The electric field EZ component of the near-field light is smaller than the electric field EX, but propagates in the Z direction. Because light is traveling from above, the intensity is stronger upward. The intensity of the electric field EX becomes large near the contact of the air discs.

Figure 3A:
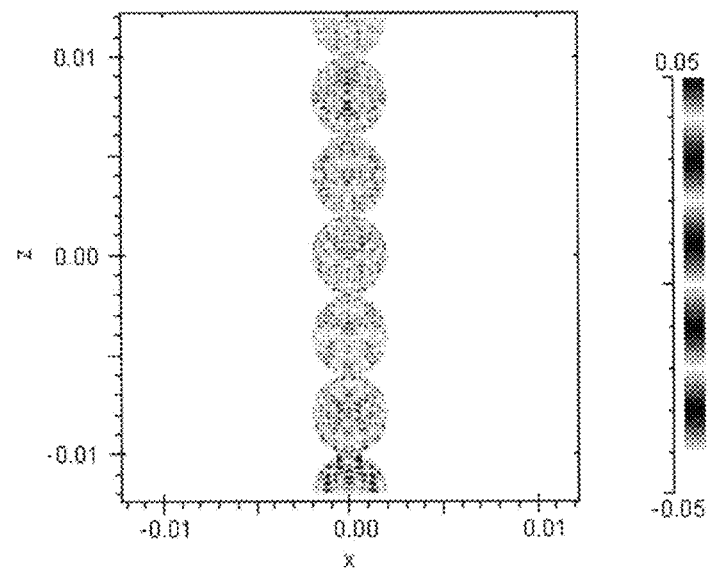
FIG. 3A is a plan view illustrating a distribution of an electric field.
Figure 3B:
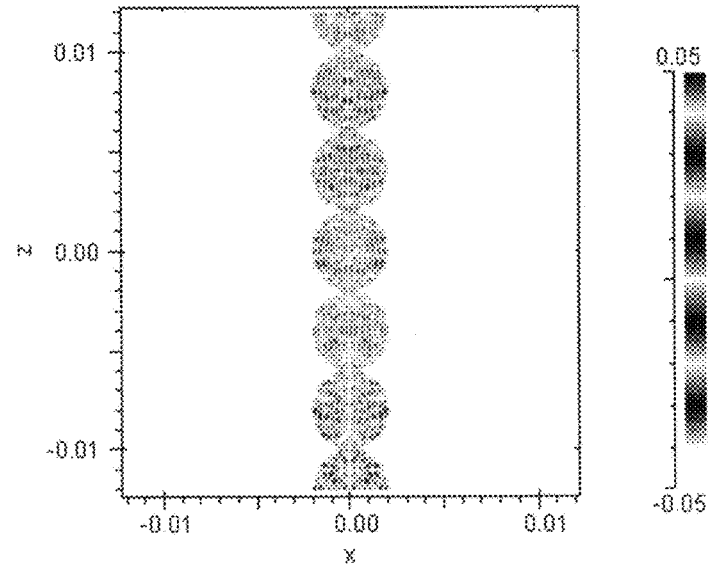
FIG. 3B is a plan view illustrating a distribution of an electric field.

FIG. 3A is a plan view illustrating a distribution of the electric field in the X direction when irradiation with broad light is performed in the waveguide according to the first embodiment, wherein the horizontal axis represents a position in the X direction and the vertical axis represents a position in the Z direction, and FIG. 3B is a plan view illustrating a distribution of the electric field in the Z direction when irradiation with broad light is performed in the waveguide according to the first embodiment, wherein the horizontal axis represents a position in the X direction and the vertical axis represents a position in the Z direction.

As shown in FIGS. 3A and 3B, when irradiation with broad light centering on 1.6 μm is performed, the electric field EX and an electric field EZ also propagate in the Z direction. However, superimposition of the near-field light by irradiation light having a plurality of wavelengths results and the spread in the lateral direction is reduced. The wavelength width is widened by an amount corresponding thereto and the number of wavelengths increases, which results in becoming close to white light. Because of this, there exist various waveguide modes mixedly and the pattern becomes more random. For example, when the center wavelength of the wavelength width is 1.6 μm, the near-field light is generated and propagates in the case of a half-value-full-width not less than 30 nm. The larger the number of wavelengths, the more the near-field light is generated and propagates. For example, if a light source is made wide by combining a plurality of lasers, the intensity of near-field light increases.

Next, a method for manufacturing a waveguide according to the embodiment will be explained.

FIGS. 4A to 4D are process cross-sectional views illustrating a method for manufacturing the waveguide according to the first embodiment.

Figure 4A:
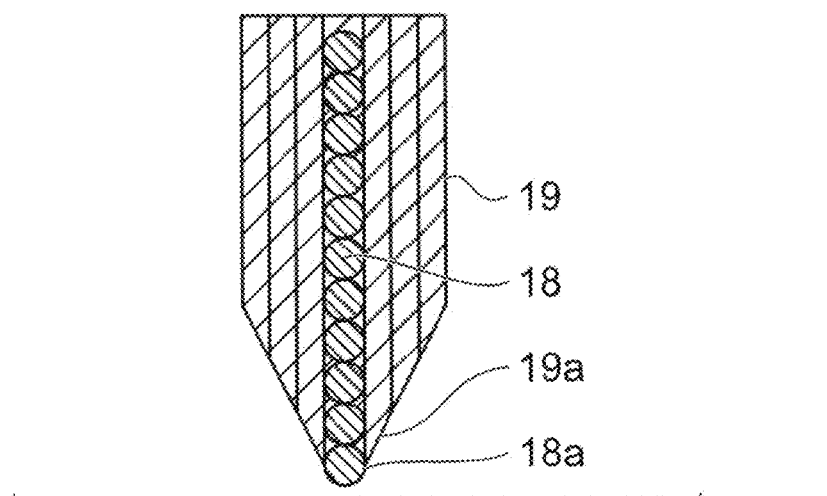
FIGS. 4A to 4D are process cross-sectional views illustrating a method for manufacturing the waveguide according to the first embodiment.

As shown in FIG. 4A, first, the substrate 11, for example, a silicon substrate, is prepared. Next, a g-line resist 17 is coated onto the substrate 11, at a thickness of, for example, 10 nm. Next, a nanotube 19 in which a plurality of metal nanoparticles 18 are crammed in a row is prepared. The diameter of the metal nanoparticle 18 is, for example, 4 nm. One metal nanoparticle 18a is exposed at a tip end 19a of the nanotube 19. Then, the exposed metal nanoparticle 18a is disposed on the resist 17.

Next, the near-field light is caused to propagate to the metal nanoparticle 18a. Then, the resist 17 is exposed by the near-field light in the vicinity of the surface of the metal nanoparticle 18a. Due to this, an exposed portion 17a in a shape of a circle when viewed from above is formed on the resist 17. The diameter of the exposed portion 17a when viewed from above is set to, for example, 4 nm, which is the same as the diameter of the metal nanoparticle 18.

Figure 4B:
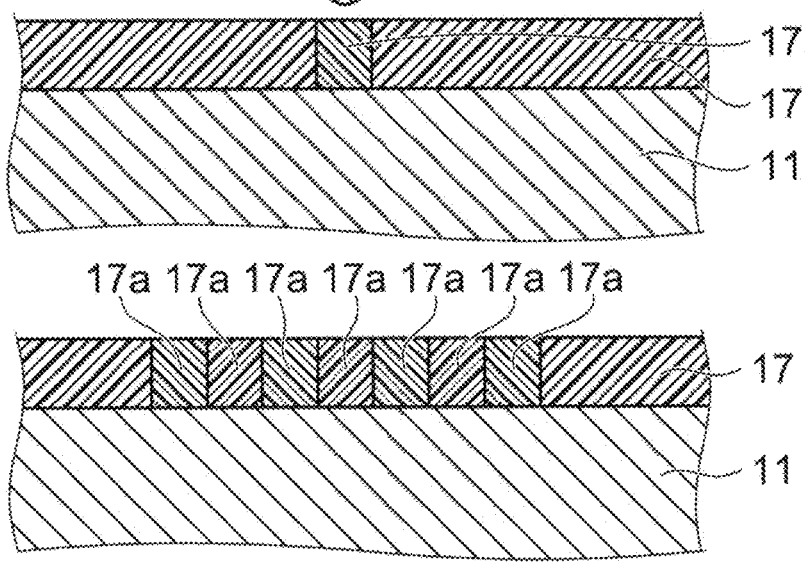

Next, as shown in FIG. 4B, by moving the nanotube 19 in one direction while repeating exposure, lifting, moving, lowering, and exposure, a plurality of the exposed portions 17a are formed so as to be arrayed in one direction on the resist 17. Each of the exposed portions 17a is formed so as to be circular when viewed from above. Furthermore, each of the exposed portions 17a is formed so as to come into contact with the neighboring exposed portion 17a when viewed from above. After that, the exposed portion 17a is removed. Due to this, a pattern in which holes are arrayed in one direction is formed on the resist 17.

Figure 4C:
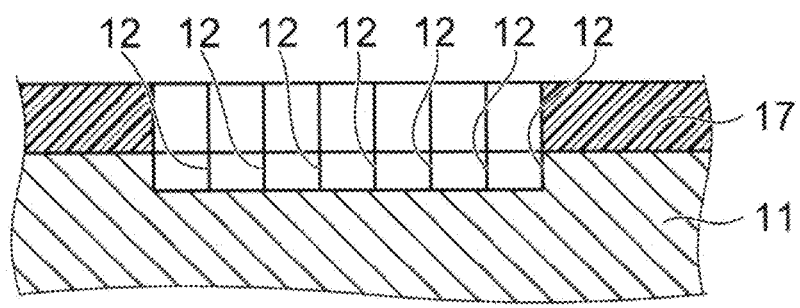

Next, as shown in FIG. 4C, a plurality of the concave parts 12 are formed in the substrate 11 by performing dry etching through the use of the resist 17 in which the pattern is formed as a mask. The depth of the concave part 12 is set to, for example, 4 nm.

Figure 4D:
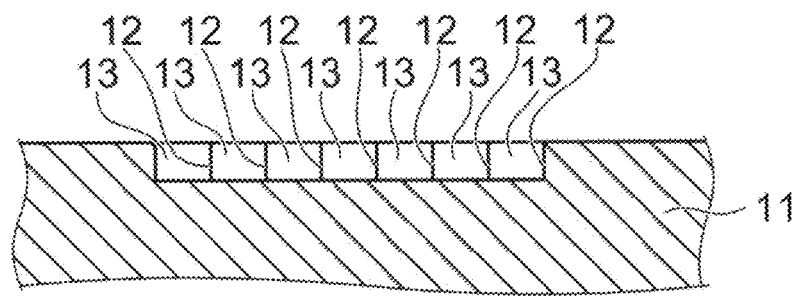

Next, as shown in FIG. 4D, the resist 17 is removed. In this way, the waveguide 1 including a plurality of the air discs 13 in the substrate 11 is formed. Exposure is performed through the use of near-infrared having a wavelength of 886 nm.

Next, the effect of the embodiment will be explained.

The waveguide 1 of the embodiment is configured by the air disc 13. In the air disc 13, it is possible to cause the near-field light to propagate even with an outer diameter not more than 20 nm. Due to this, it is possible to make the waveguide 1 finer.

Furthermore, the near-field light propagates the waveguide 1. Consequently, even if the width of the waveguide 1 is reduced, the resistance does not increase, and thus it is possible to make the waveguide 1 finer.

The air disc 13 is formed in the substrate 11. It is possible to generate the near-field light by performing irradiation with light passing through the substrate 11. For example, with a wavelength not less than 1.2 μm, the transparency to the silicon substrate increases. Consequently, the irradiation light is not absorbed by the substrate 11, and thus it is possible to reduce the loss of irradiation light.

If the diameter of the air disc 13 is not more than 20 nm, it is possible to magnify the effect of waveguide or diffusion of the near-field light. When the diameter is large, the intensity of electric field of the near-field light is reduced and the confinement effect of the near-field light is lessened.

By using a silicon substrate as the substrate 11 and by forming the air disc 13 in the silicon substrate, it is possible to set the difference in the refractive index to not less than 2. Due to this, it is possible to strengthen the electric field within the air disc 13 and at the interface. Furthermore, it is possible to reduce the diameter of the air disc 13, and thus it is possible to magnify the confinement effect of the near-field light.

The air disc 13 is formed by filling the interior of the concave part 12 with air, but this not limited. It may also be possible to form the air disc 13 in which the pressure of the interior of the concave part 12 is reduced.

Moreover, the concave parts 12 are formed so that the neighboring concave parts 12 are in contact, but this is not limited. It may also be possible for the interval between the neighboring concave parts 12 to be not more than the inner diameter. That is, the interval between the air discs 13 may be not more than the outer diameter.

(First Modification of the First Embodiment)

Next, a first modification of the first embodiment will be explained. The modification is an embodiment in which two waveguides are arranged side by side.

Figure 5A:
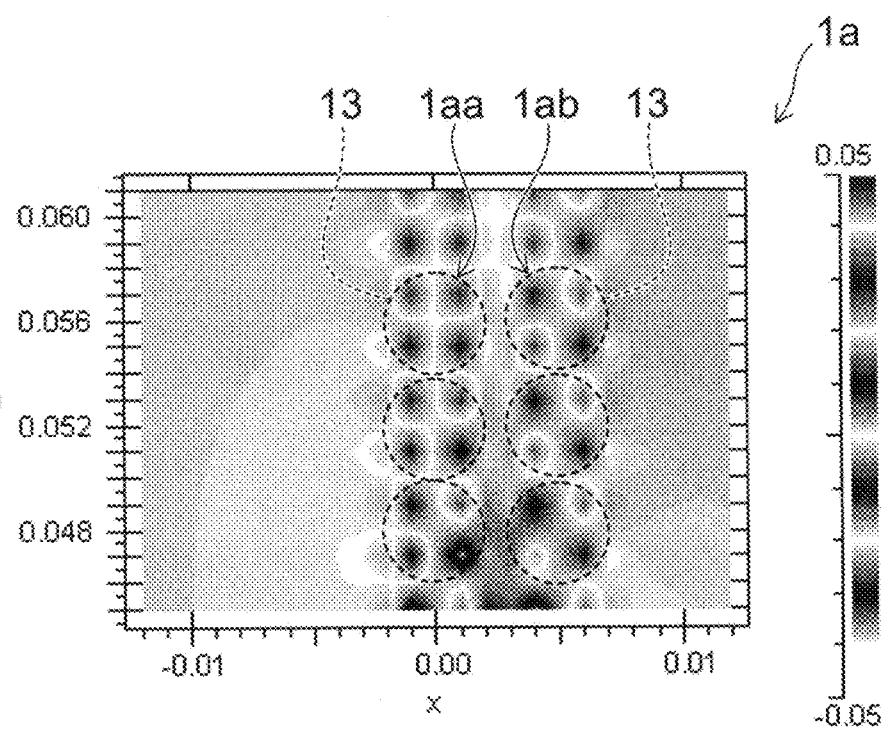
FIG. 5A is a plan view illustrating a distribution of an electric field.
Figure 5B:
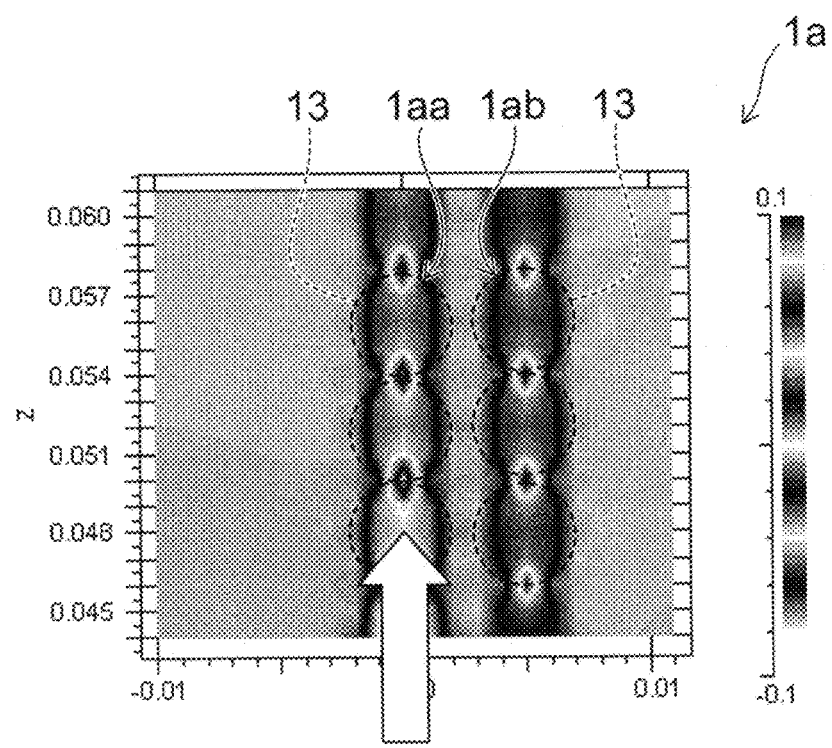
FIG. 5B is a plan view illustrating a distribution of an electric field.

FIG. 5A is a plan view illustrating a distribution of the electric field in the X direction when irradiation with single wavelength light is performed in a waveguide according to the first modification of the first embodiment, wherein the horizontal axis represents a position in the X direction and the vertical axis represents a position in the Z direction, and FIG. 5B is a plan view illustrating a distribution of the electric field in the Z direction when irradiation with single wavelength light is performed in the waveguide according to the first modification of the first embodiment, wherein the horizontal axis represents a position in the X direction and the vertical axis represents a position in the Z direction.

As shown in FIGS. 5A and 5B, in a waveguide 1a according to the modification, two waveguides, that is, a waveguide 1aa and a waveguide 1ab, extending in the Z direction are disposed so as to be adjacent to each other. The interval between the waveguide 1aa and the waveguide 1ab is set to, for example, 1 nm. Consequently, the pitch in the X direction is 5 nm. The configuration of each of the waveguide 1aa and the waveguide 1ab is the same as that of the waveguide 1 according to the first embodiment described above, and thus explanation thereof is omitted.

When the waveguide 1aa on one side is irradiated with single wavelength light, for example, light having a wavelength of 1.55 micrometers (μm), the near-field light is generated in the other waveguide 1ab. As described above, when the two waveguide 1aa and waveguide 1ab are disposed at, for example, an interval of 1 nm, the crosstalk of the near-field light is caused.

FIG. 6A is a plan view illustrating a distribution of the electric field in the X direction when irradiation with broad light is performed in the waveguide according to the first modification of the first embodiment, wherein the horizontal axis represents a position in the X direction and the vertical axis represents a position in the Z direction, and FIG. 6B is a plan view illustrating a distribution of the electric field in the Z direction when irradiation with broad light is performed in the waveguide according to the second modification of the first embodiment, wherein the horizontal axis represents a position in the X direction and the vertical axis represents a position in the Z direction.

As shown in FIGS. 6A and 6B, in the waveguide 1a of the modification, when the waveguide 1aa on one side is irradiated with broad light, for example, light having broad wavelengths of 1.55 micrometers (μm) as a center, the near-field light is generated in the waveguide 1aa. However, the near-field light generated in the waveguide 1aa on one side does not propagate to the other waveguide 1ab. That is, the crosstalk is not caused. This is because by the fact that the wavelength width increases, there is no longer leakage of the near-field light.

Figure 7:
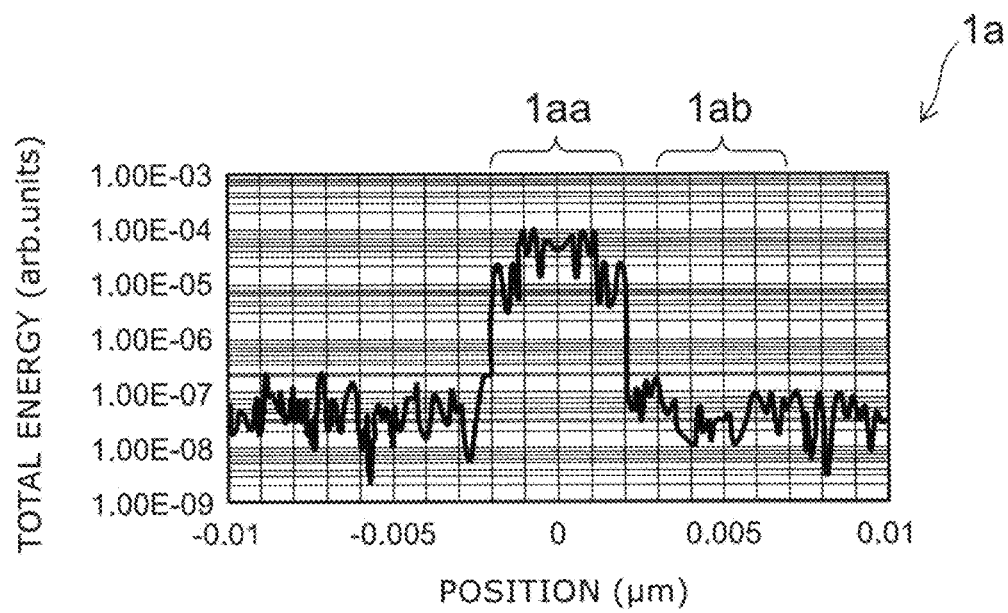
FIG. 7 is a graph illustrating an amount of crosstalk.

FIG. 7 is a graph illustrating an amount of crosstalk when broad light is irradiated in the waveguide according to the first modification of the first embodiment, wherein the horizontal axis represents a position in the X direction and the vertical axis represents total energy.

As shown in FIG. 7, when the waveguide 1a of the modification is irradiated with broad light, the amount of crosstalk of the near-field light generated in the waveguide 1aa on one side to the other waveguide 1ab is reduced. For example, the total energy of the electric field EX and the electric field EZ having propagated to the other waveguide 1ab is reduced to one thousandth of that of the waveguide 1aa on one side.

Next, the effect of the modification will be explained.

In the modification, by controlling the wavelength of incident light, it is possible to control crosstalk. The configuration, operation, and effect other than the above in the modification are the same as those of the first embodiment described above.

(Second Modification of the First Embodiment)

Next, a second modification of the first embodiment will be explained.

Figure 8:
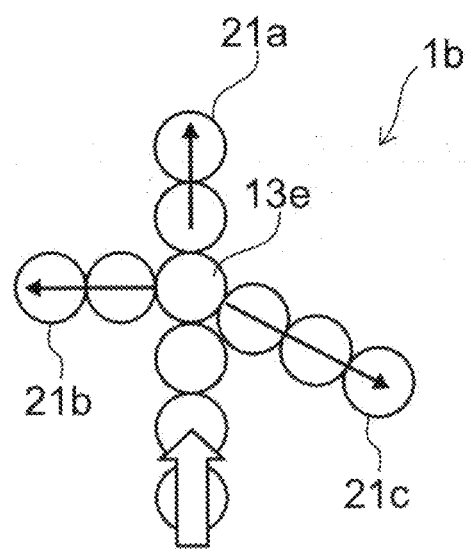
FIG. 8 is a plan view illustrating a waveguide according to a second modification of the first embodiment.

FIG. 8 is a plan view illustrating a waveguide according to the second modification of the first embodiment.

As shown in FIG. 8, a waveguide 1b in the modification is provided with a portion 21a extending in one direction and two portions, that is, a portion 21b and a portion 21c extending in directions intersecting with the direction in which the portion 21a extends. The portion 21b and the portion 21c are disposed so as to extend in two directions, by using one air disc 13e other than those at both ends of the portion 21a as a base point.

The waveguide 1b in the modification includes the portion 21a, the portion 21b, and the portion 21c branching in three directions. Even when the waveguide 1b branches into three, it is possible to propagate the near-field light. It is possible to propagate the near-field light even when increasing the curvature of the path through which the near-field light propagates by reducing the angles between the portion 21a and the portion 21b and between the portion 21a and the portion 21c. The strength of the electric field is divided equally to each waveguide. The configuration, operation, and effect other than the above in the modification are the same as those of the first embodiment described above.

(Second Embodiment)

Next, a second embodiment will be explained.

Figure 9:
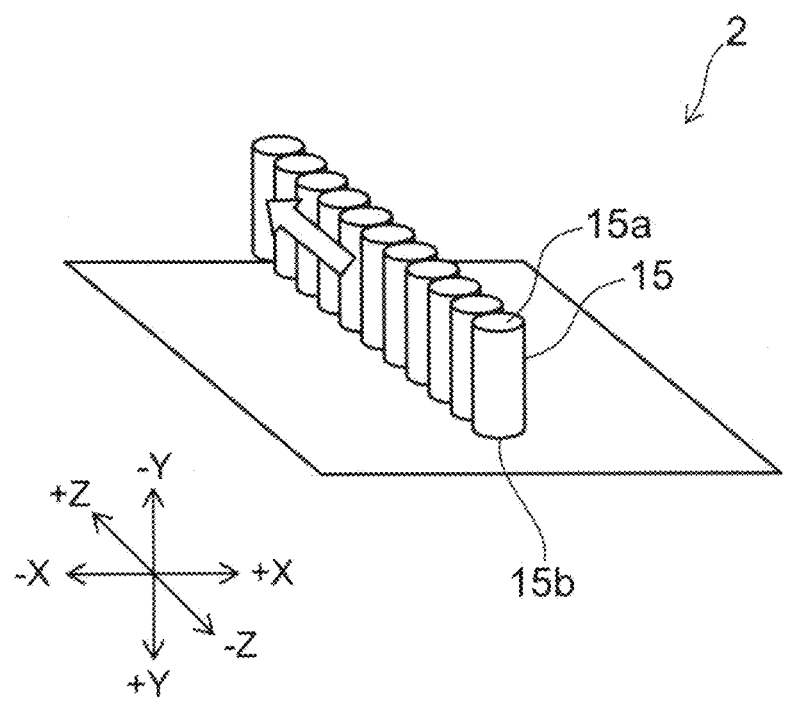
FIG. 9 is a perspective view illustrating a waveguide according to a second embodiment.

FIG. 9 is a perspective view illustrating a waveguide according to the second embodiment.

The embodiment is an embodiment in which the cylindrical body and the materials therearound in the first embodiment described above are exchanged.

As shown in FIG. 9, a waveguide 2 according to the embodiment is provided with a plurality of the cylindrical bodies 15. The cylindrical body 15 includes, for example, silicon. The plurality of the cylindrical bodies 15 are disposed so as to be arrayed in one direction in a face parallel to a bottom face 15b of the cylindrical body 15.

Hereinafter, in the specification, in order to explain the waveguide 2, the XYZ-orthogonal coordinate system is adopted. In the XYZ-orthogonal coordinate system, in the face parallel to the bottom face 15b of the cylindrical body 15, one of the directions in which the cylindrical bodies 15 are arrayed is set to be the +Z direction and the opposite direction is set to be the −Z direction. In the face parallel to the bottom face 15b, one of the directions perpendicular to the +Z direction is set to be the +X direction and the opposite direction is set to be the −X direction. One of the directions perpendicular to both the +X direction and the +Z direction is set to be the +Y direction and the opposite direction is set to be the −Y direction. The height direction of the cylindrical body 15 is the −Y direction. The "+X direction" and the "−X direction" are also generically referred to as the "X direction". The "+Y direction" and the "−Y direction" are also generically referred to as the "Y direction". The "+Z direction" and the "−Z direction" are also generically referred to as the "Z direction".

The plurality of cylindrical bodies 15 are formed so as to be arrayed in the Z direction. An upper face 15a of the cylindrical body 15 is circular when viewed from above, that is, from the −Y direction. The cylindrical body 15 is in a shape of a cylinder formed into the same inner diameter, downward from the upper face 15a. Consequently, the cross-section of the cylindrical body 15 parallel to the upper face 15a has also the same circular shape as the upper face 15a. The cross-section includes an arc. The inner diameter of the cylindrical body 15 is set to, for example, 50 nm to 1 nm, preferably 20 nm to 1 nm, and more preferably 10 nm to 1 nm, for example, 4 nm. The height of the cylindrical body 15 is set to not more than 20 nm, preferably 4 nm. The plurality of the cylindrical bodies 15 are disposed so that the upper faces 15a come into contact when viewed from the −Y direction.

The refractive index of silicon included in the cylindrical body 15 is 3.5 and the refractive index of the air around the cylindrical body 15 is approximately 1. Consequently, the difference in the refractive index between the cylindrical body 15 and the surroundings of the cylindrical body 15 is not less than 2, for example, 2.5.

Figure 10A:
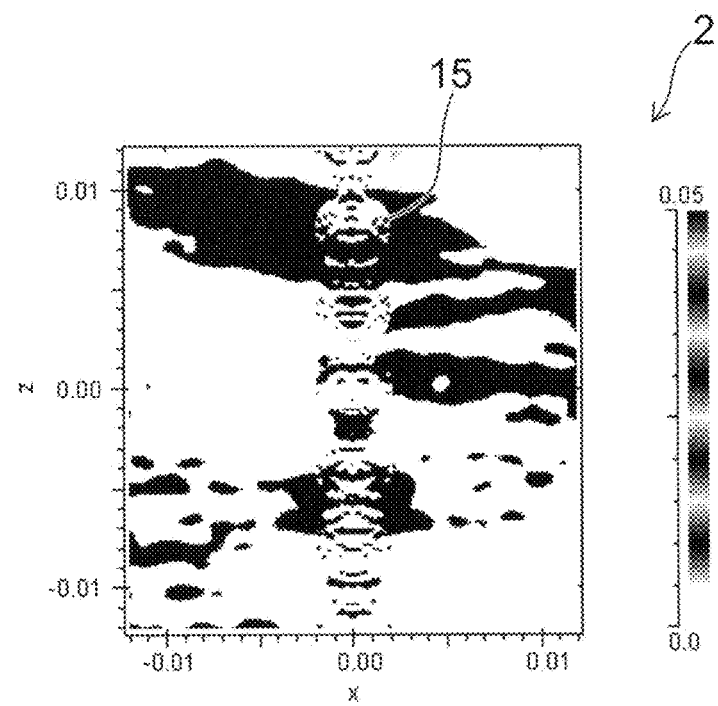
FIG. 10A is a plan view illustrating a distribution of an electric field.
Figure 10B:
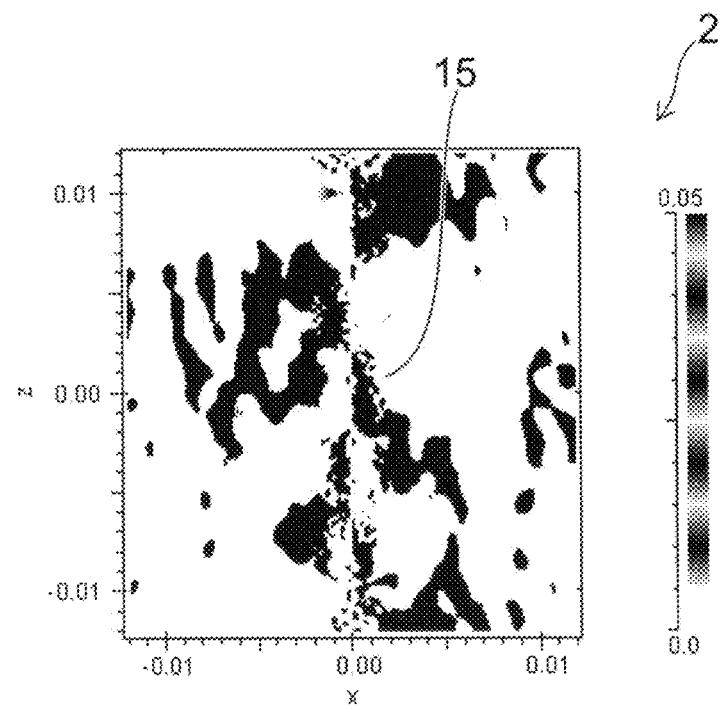
FIG. 10B is a plan view illustrating a distribution of an electric field.

FIG. 10A is a plan view illustrating a distribution of the electric field in the X direction when irradiation with single wavelength light is performed in the waveguide according to the second embodiment, wherein the horizontal axis represents a position in the X direction and the vertical axis represents a position in the Z direction, and FIG. 10B is a plan view illustrating a distribution of the electric field in the Z direction when irradiation with single wavelength light is performed in the waveguide according to the second embodiment, wherein the horizontal axis represents a position in the X direction and the vertical axis represents a position in the Z direction.

Figure 11:
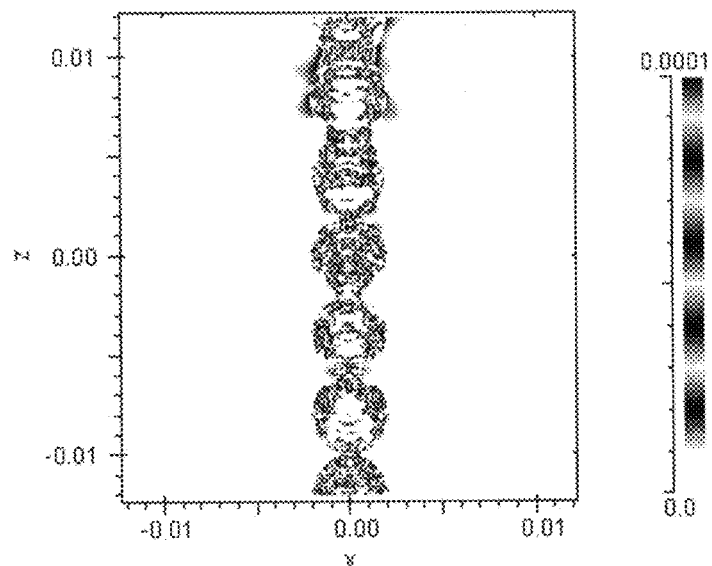
FIG. 11 is a plan view illustrating a distribution of total energy.

FIG. 11 is a plan view illustrating a distribution of total energy when irradiation with single wavelength light is performed in the waveguide according to the second embodiment, and the horizontal axis represents a position in the X direction and the vertical axis represents a position in the Z direction.

As shown in FIGS. 10A, 10B and 11, the electric field is lower than that in the first embodiment shown in FIGS. 2B and 2C described above. However, the electric field functions as the waveguide 2 in terms of total energy.

Next, a method for manufacturing the waveguide 2 according to the second embodiment will be explained.

In the method for manufacturing the waveguide 2, it is possible to form the waveguide 2 by lithography using the near-field light as in the case of the waveguide 1 according to the first embodiment described above. For example, after performing the processes shown in FIGS. 4A and 4B, etching for leaving the exposed portion 17a is performed. Due to this, a resist pattern in which discs are arrayed in a row is formed. Then, by performing etching of the silicon substrate using the resist pattern as a mask, it is possible to manufacture the waveguide 2. The configuration, operation, and effect other than the above in the embodiment are the same as those of the first embodiment described above.

(Third Embodiment)

Next, a third embodiment will be explained.

Figure 12:
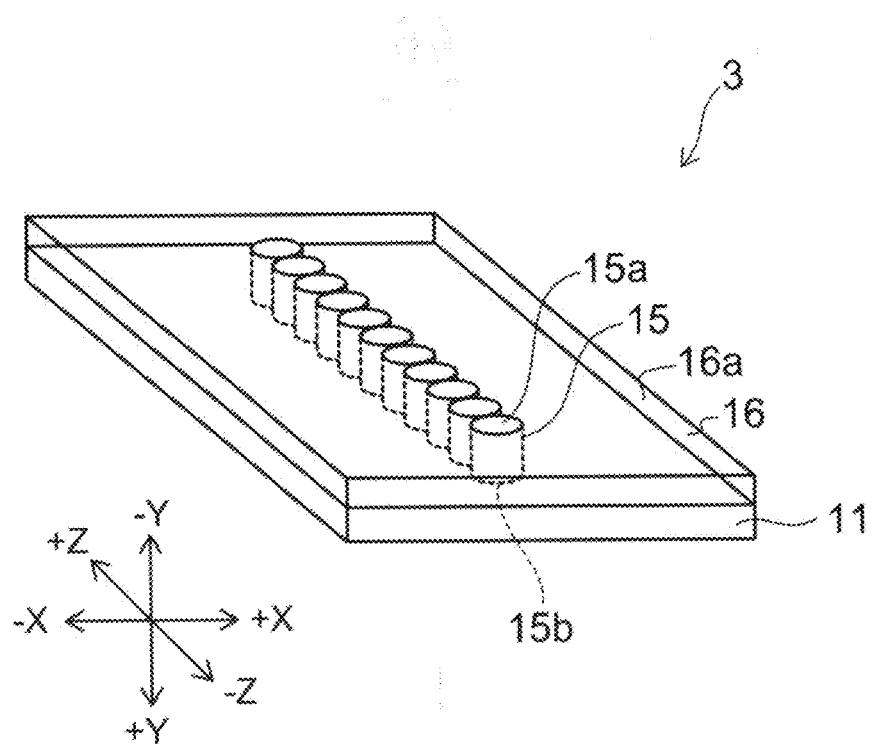
FIG. 12 is a perspective view illustrating a waveguide according to a third embodiment.

FIG. 12 is a perspective view illustrating a waveguide according to the third embodiment.

As shown in FIG. 12, a waveguide 3 according to the embodiment is provided with the substrate 11, for example, a silicon substrate. On the substrate 11, an insulating film 16, for example, a silicon oxide film is provided. In the insulating film 16, a plurality of the cylindrical bodies 15 are embedded. The cylindrical bodies 15 are disposed so as to be arrayed in one direction on an upper face 16a of the insulating film 16.

Hereinafter, in the embodiment also, in order to explain the waveguide 3, the XYZ-orthogonal coordinate system defined in the second embodiment described above is adopted.

The cylindrical bodies 15 are arrayed in the Z direction. The cylindrical body 15 includes metal, for example, gold (Au). The outer diameter of the cylindrical body 15 is set to 50 nm to 1 nm, for example, preferably 20 nm to 1 nm, and more preferably 10 nm to 1 nm, for example, 5 nm.

The lower face of the cylindrical body 15 is in contact with the substrate 11. The upper face of the cylindrical body 15 is exposed on the upper face 16a of the insulating film 16.

Figure 13A:
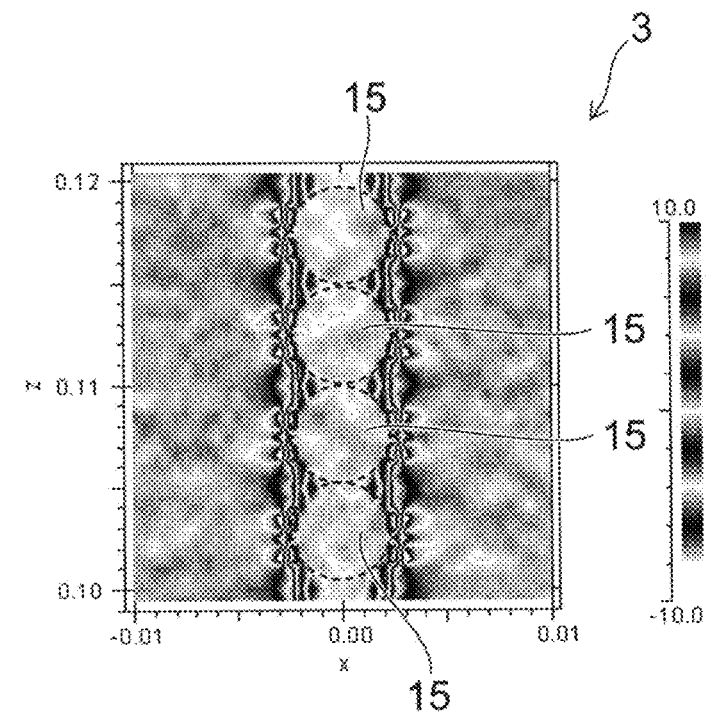
FIG. 13A is a plan view illustrating a distribution of an electric field.
Figure 13B:
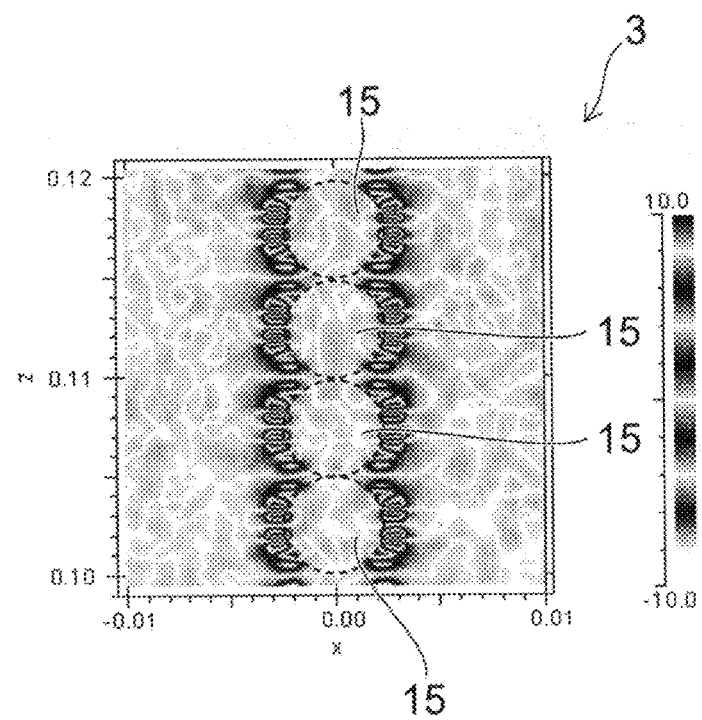
FIG. 13B is a plan view illustrating a distribution of an electric field.

FIG. 13A is a plan view illustrating a distribution of the electric field in the X direction when irradiation with single wavelength light is performed in the waveguide according to the third embodiment, wherein the horizontal axis represents a position in the X direction and the vertical axis represents a position in the Z direction, and FIG. 13B is a plan view illustrating a distribution of the electric field in the Z direction when irradiation with single wavelength light is performed in the waveguide according to the third embodiment, wherein the horizontal axis represents a position in the X direction and the vertical axis represents a position in the Z direction.

As shown in FIGS. 13A and 13B, when irradiation with single wavelength light, for example, light having a wavelength of 1.0 micrometer ($\mu$m) is performed, the electric field EX component of the near-field light propagates in the Z direction. The electric field EZ component of the near-field light also propagates in the Z direction. The electric field of the near-field light is generated on the periphery of the cylindrical body 15.

When the cylindrical body 15 includes metal, the period of the wave of the near-field light is different from the waveguiding wavelength. As the near-field light, a wave having a wavelength of 1 nm is formed. The energy is determined by the frequency. Here, the frequency is the frequency of the waveguiding light. As a result, the slope of the diffusion curve of the waveguiding near-field light is very flat. When changing the wavelength, the pattern of the electric field changes and it is possible to multiplex wavelengths. Ordinarily, in the case of wavelength multiplexing, the degree of multiplexing is proportional to the cube of wavelength and in the case of propagating light, the wavelength is as long as not less than hundreds nm, and thus the recording density is not increased to a required level. However, as described above, the period of the periodic near-field light generated on the periphery of the cylindrical body 15 is smaller than the wavelength of the light source by about three orders of magnitude, and thus it is possible to increase the recording density by about $10^7$ to $10^9$ by the wavelength multiplexing of the propagating light.

In the embodiment, the cylindrical body 15 is made of metal and the insulating film 16 is provided around the cylindrical body, but this is not limited. For example, it may also be possible to exchange the cylindrical body 15 and the materials around the cylindrical body 15. For example, it may also be possible to use the cylindrical body 15 as the insulating film 16 and to use metal as the materials around the cylindrical body 15. Furthermore, when visible light is used as irradiation light, a silicon oxide film that is transparent to visible light is preferable as the insulating film 16. When light having a wavelength longer than 1.2 $\mu$m is used as irradiation light, the insulating film 16 may be a silicon film.

The cylindrical body 15 includes gold, but this is not limited. For example, it may also be possible to include at least one metal selected from a group consisting of gold, silver, copper, aluminum, and chromium.

(Fourth Embodiment)

Figure 14:
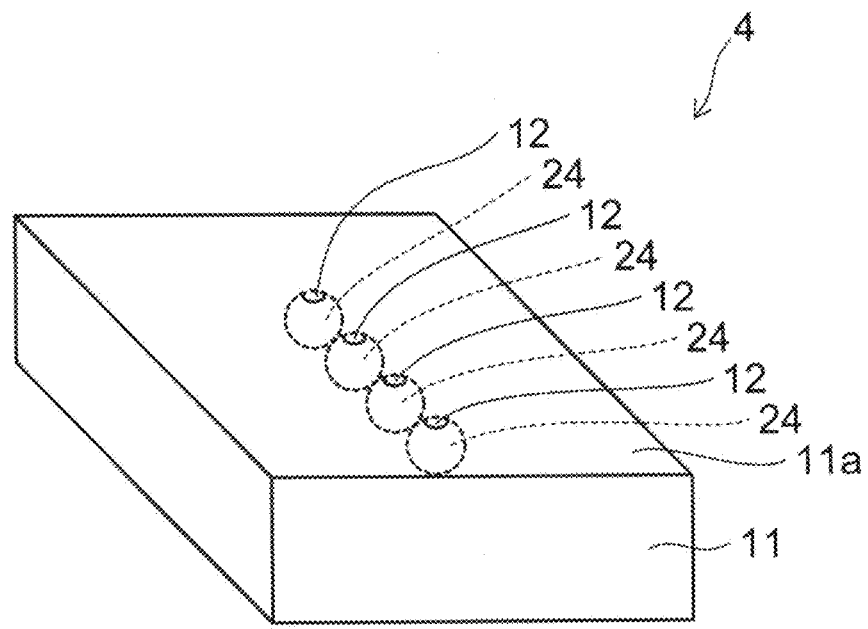
FIG. 14 is a perspective view illustrating a waveguide according to a fourth embodiment.

FIG. 14 is a perspective view illustrating a waveguide according to a fourth embodiment.

As shown in FIG. 14, a waveguide 4 according to the embodiment is provided with the substrate 11, for example, a silicon substrate. On the upper face 11a of the substrate 11, a plurality of the concave parts 12 extending in one direction are formed. The concave part 12 is formed into a shape of a spherical ball hollowed from the substrate 11. The interior of the concave part 12 is filled with, for example, air. The air filled in the interior of the concave part 12 is referred to as an "air ball 24".

Consequently, it can be said that in the waveguide 4, a plurality of the spherical air balls 24 are arrayed in one direction. The cross-section of the air ball 24 is circular and includes an arc. The air balls 24 are arrayed on the face parallel to the upper face 11a. The interval between the centers of the neighboring air balls 24 in the cross-section parallel to the upper face 11a is set to the diameter of the air ball 24. The refractive index of silicon is 3.5 in the infrared region, which is a transparent wavelength region. In contrast, the refractive index of air is approximately 1. Therefore, the difference in the refractive index between the air ball 24 and the surroundings of the air ball 24 is not less than 2, for example, 2.5.

In the waveguide 4 as described above, by irradiating the air ball 24 at one end, it is also possible to propagate the near-field light to the air ball 24 at the other end of the waveguide 4.

The air ball 24 as described above is formed by, for example, controlling the etching condition shown in FIG. 4C. The configuration, operation, and effect other than the above in the embodiment are the same as those of the first embodiment described above.

The interval between the centers of the neighboring air balls 24 in the cross-section parallel to the upper face 11a is set to the diameter of the air ball 24, but this is not limited. It may also be possible to set the interval between the centers to not more than twice the diameter.

(Fifth Embodiment)

Figure 15:
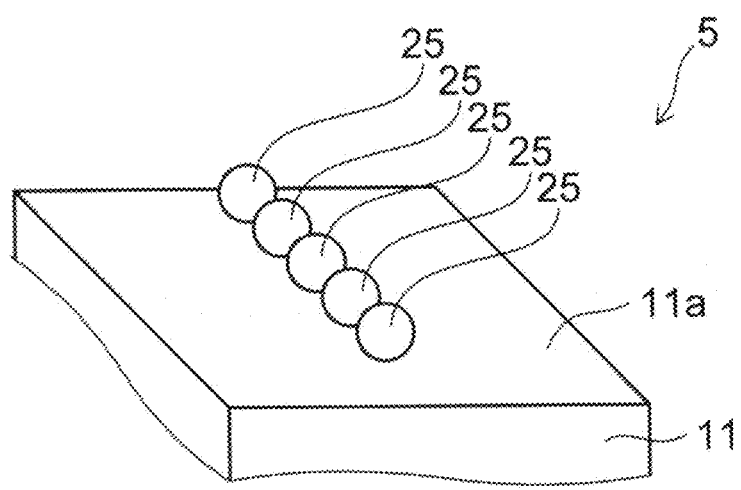
FIG. 15 is a perspective view illustrating a waveguide according to a fifth embodiment.

FIG. 15 is a perspective view illustrating a waveguide according to a fifth embodiment.

As shown in FIG. 15, a waveguide 5 according to the embodiment is provided with the substrate 11. On the substrate, spherical bodies 25 arrayed in one direction are provided. The spherical body 25 includes metal. The cross-section of the spherical body 25 is circular and includes an arc. The interval between the centers of the neighboring spherical bodies 25 in the cross-section parallel to the upper face 11a is set to be the diameter of the spherical body 25. In the waveguide 5 as described above, by irradiating the spherical body 25 at one end, it is also possible to propagate the near-field light up to the spherical body 25 at the other end of the waveguide 5. The configuration, operation, and effect other than the above in the embodiment are the same as those of the first embodiment described above. The interval between the centers of the neighboring spherical bodies 25 in the cross-section parallel to the upper face 11a is set to be the diameter of the spherical body 25, but this is not limited. It may also be possible to set the interval between the centers to be not more than twice the diameter.

(Sixth Embodiment)

Next, a sixth embodiment will be explained.

Figure 16:
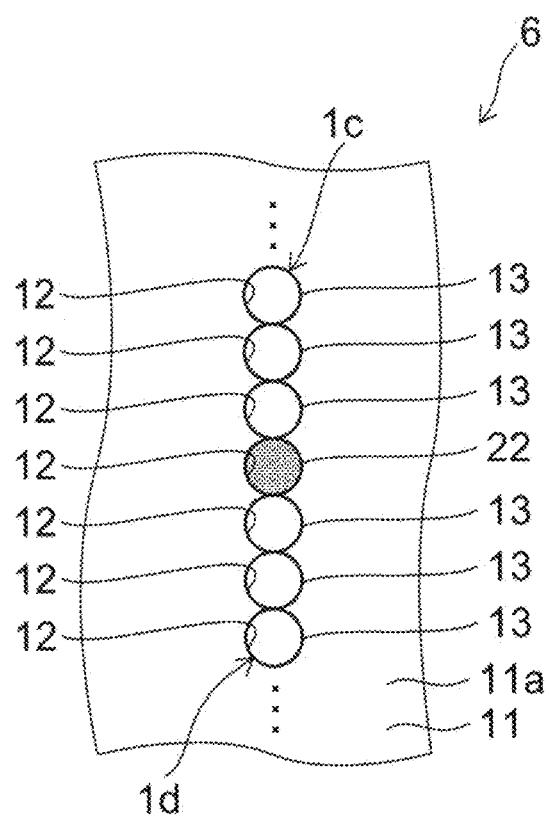
FIG. 16 is a top view illustrating an integrated circuit according to a sixth embodiment.

FIG. 16 is a top view illustrating an integrated circuit according to the sixth embodiment.

As shown in FIG. 16, an integrated circuit 6, for example, a storage device according to the embodiment is provided with the substrate 11, for example, a silicon substrate. In the substrate 11, a cylindrical body 22 is embedded. The upper face of the cylindrical body 22 is exposed on the upper face of the substrate 11. The cylindrical body 22 includes a phase-change material, for example, SnTeSe, the resistance of which changes with the change of phase.

On the upper face 11a of the substrate 11, a plurality of the concave parts 12 arrayed in one direction and in the opposite direction of the one direction are formed, with the cylindrical body 22 as a starting point. The interior of the concave part 12 is filled with air and configures the air disc 13. Due to this, two waveguides, that is, a waveguide 1c and a waveguide 1d extending in the one direction and in the opposite direction of the one direction are formed, with the cylindrical body 22 as a starting point. The side faces of the neighboring air discs 13 in the waveguide 1c and the waveguide 1d are in contact with each other. The air disc 13 at one end of the waveguide 1c and that of the waveguide 1d are in contact with the cylindrical body 22.

Next, the operation of the embodiment will be explained.

The end part on the opposite side of the end part at which the cylindrical body 22 is disposed in the waveguide 1c is irradiated with light. The irradiation light is collected by an object lens and the wavelength is set to 1.3 microns and the power density is set to about 100 kW/cm². Then, the near-field light propagated to the end part on the opposite side of the end part at which the cylindrical body 22 is disposed in the waveguide 1d is observed by an aperture probe having a resolution of 50 nm. Next, by performing irradiation with incident light having a wavelength of 870 nm and a power density of about 10 MW/cm² for 1 μsec, SnTeSe of the cylindrical body 22 is turned into an amorphous material. Then, again, irradiation with light having about a power density of about 100 kW/cm² is performed and the near-field light propagated to the end part on the opposite side of the end part at which the cylindrical body 22 is disposed in the waveguide 1d is observed. By comparing the amount of transmitted light with the initial amount of transmitted light, the amount of transmitted light is reduced by about 30%, when SnTeSe is in an amorphous state. This means that SnTeSe is sensitive to the change in refractive index.

Next, the operation of the embodiment will be explained.

The amount of transmitted light in a state where no information is written is measured in advance.

Next, when writing information, irradiation with irradiation light capable of turning the cylindrical body 22 into an amorphous material is performed. For example, it is specified that the state where the cylindrical body 22 is turned into an amorphous material is data "0" and the state where the cylindrical body 22 is not turned into an amorphous material is data "1".

Next, when reading information, the cylindrical body 22 is irradiated with irradiation light that does not change the phase and the amount of transmitted light is measured. When the amount of transmitted light does not change, data "1" is read. When the amount of transmitted light reduces, data "0" is read. In this way, the cylindrical body 22 is caused to operate as a storage element.

Next, a method for manufacturing the integrated circuit 6 of the embodiment will be explained.

FIGS. 17A to 17D are process cross-sectional views illustrating the method for manufacturing the integrated circuit according to the sixth embodiment.

First, as in the first embodiment described above, the process shown in FIG. 4A is performed. Explanation of these processes is omitted.

Figure 17A:
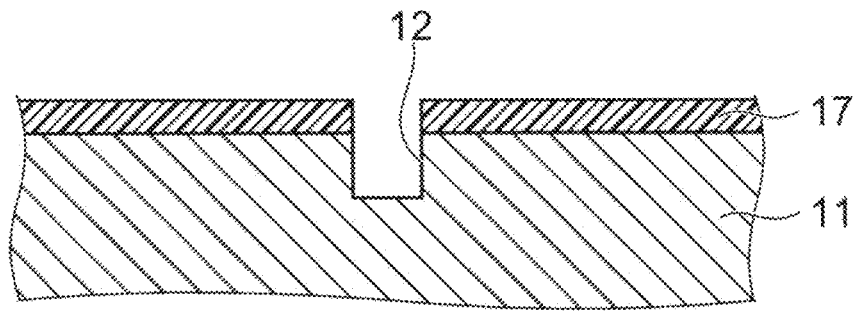
FIGS. 17A to 17D are process cross-sectional views illustrating the method for manufacturing the integrated circuit according to the sixth embodiment.

Next, as shown in FIG. 17A, the exposed portion 17a is removed. Due to this, a hole is formed in the resist 17. By using the resist 17 in which a hole is formed as a mask, dry etching is performed and the concave part 12 is formed in the substrate 11. The depth of the concave part 12 is set to, for example, 5 nm.

Figure 17B:
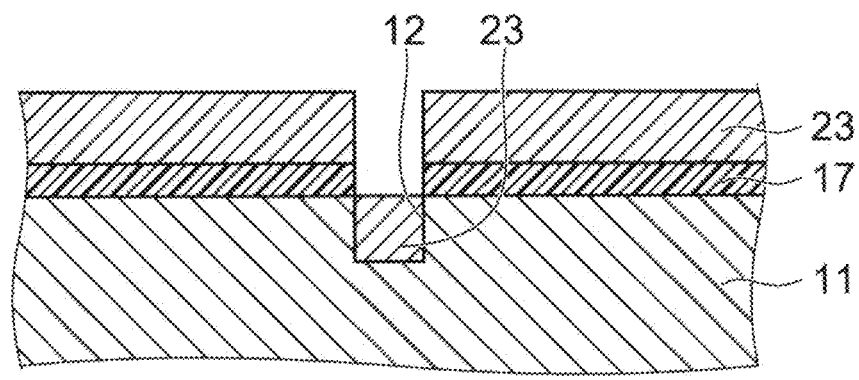

Next, as shown in FIG. 17B, by sputtering, a phase-change material 23, for example, SnTeSe, is deposited on the substrate 11 so as to fill in the concave part 12.

Figure 17C:
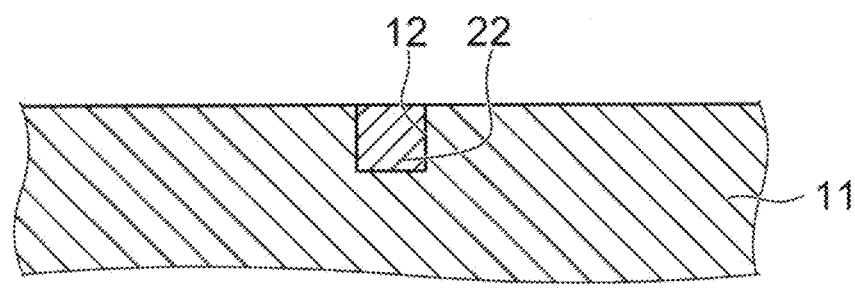
Figure 17D:
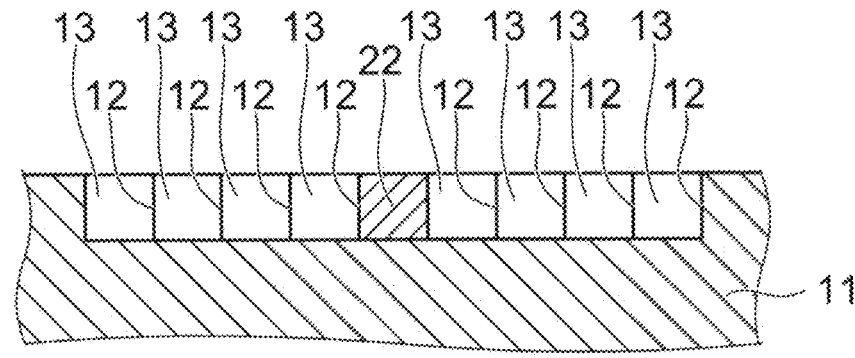

Next, as shown in FIG. 17C, the resist 17 and the phase-change material 23 deposited on the resist 17 are removed. Due to this, the cylindrical body 22 is formed within the concave part 12.

Next, the concave parts 12 are formed so as to be arrayed sandwiching the cylindrical body 22. In this way, the integrated circuit 6 shown in FIG. 16 is manufactured. Exposure is performed with near infrared having a wavelength of 886 nm.

Next, the effect of the embodiment will be explained.

According to the embodiment, it is possible to form the integrated circuit 4, for example, a storage device, using the waveguide 1c and the waveguide 1d. It is possible to make finer the cylindrical body 22 functioning as a storage element and the waveguide 1c and the waveguide 1d functioning as wiring, and thus, it is possible to make the integrated circuit 6 finer. The configuration and effect other than the above in the embodiment are the same as those of the first embodiment described above.

In the configuration, the phase-change mechanism is used for recording, but a photochromic mechanism may also be used.

(Seventh Embodiment)

Next, a seventh embodiment will be explained.

Figure 18:
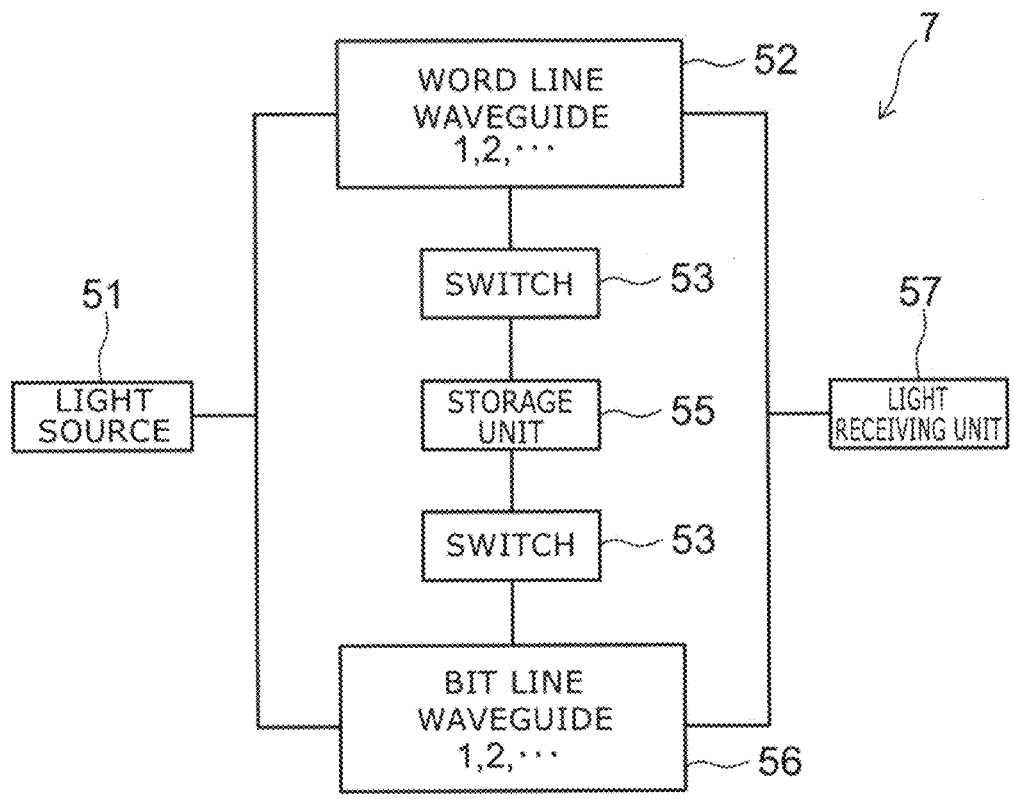
FIG. 18 is a block diagram illustrating an integrated circuit according to a seventh embodiment.

FIG. 18 is a block diagram illustrating an integrated circuit according to the seventh embodiment.

Figure 19:
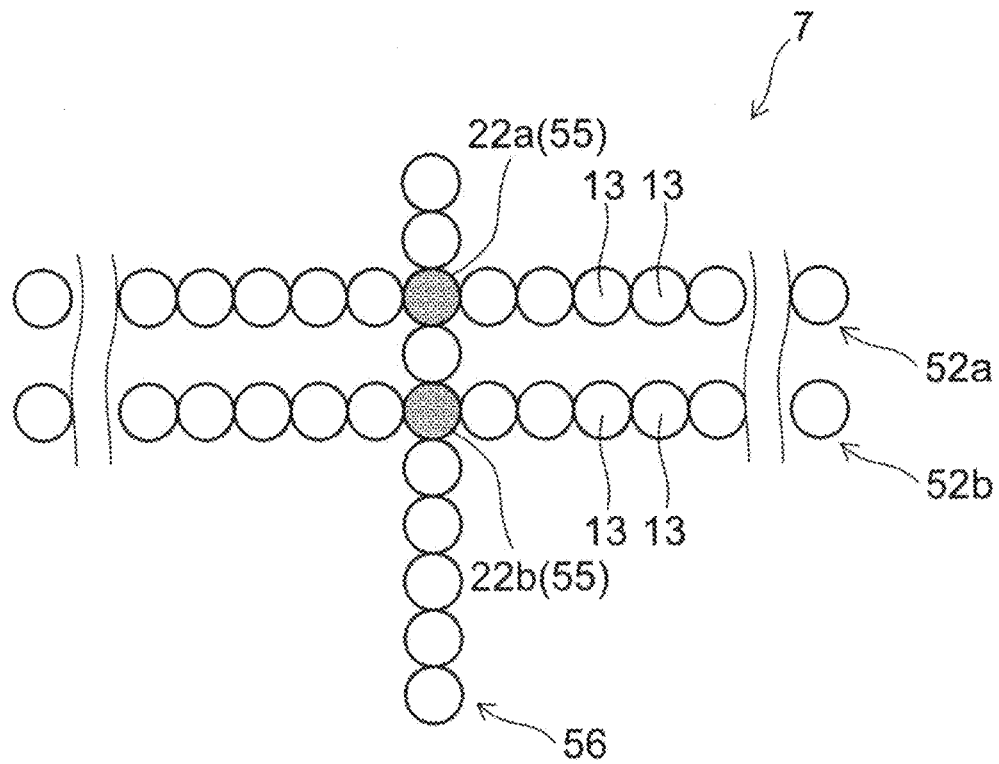
FIG. 19 is a top view illustrating an integrated circuit according to a seventh embodiment.

FIG. 19 is a top view illustrating the integrated circuit according to the seventh embodiment.

As shown in FIGS. 18 and 19, an integrated circuit 7 according to the embodiment, for example, a storage device, is provided with a light source 51, a plurality of word line waveguides 52, a plurality of switches 53, a plurality of storage units 55, a plurality of bit line waveguides 56, and a light receiving unit 57.

The word line waveguide 52 includes a plurality of the air discs 13 arrayed in one direction. The bit line waveguide 56 includes a plurality of the air discs 13 arrayed in the direction perpendicular to one direction and intersecting with the one direction.

One end of the word line waveguide 52 and that of the bit line waveguide 56 are connected to the light source 51. Furthermore, the other ends of the word line waveguide 52 and the bit line waveguide 56 are connected to the light receiving unit 57.

The storage units 55 are a cylindrical body 22a and a cylindrical body 22b including the phase-change material. Both ends of the storage unit 55 are connected to the word line waveguide 52 and the bit line waveguide 56, via the switch 53.

Next, the operation will be explained.

When writing information, each of the bit line waveguide 56 and a word line waveguide 52a is irradiated with light having half the power density capable of turning the phase-change material included in the cylindrical body 22a, into an amorphous. Due to this, the phase-change material included in the cylindrical body 22a is turned into an amorphous material. The phase-change material included in the cylindrical body 22b disposed at the intersection of the bit line waveguide 56 and a word line waveguide 52b remains the crystalline phase. For example, it is specified that the state where the phase-change material is turned into an amorphous material is data "0" and the state where the phase-change material is not turned into an amorphous material is data "1".

Then, when reading information, the bit line waveguide 56 is irradiated with light whose power density is reduced to about one fiftieth. Due to this, the amount of near-field light taken out of the word line waveguide 52a is reduced. In contrast, the amount of near-field light taken out of the word line waveguide 52b does not change. Because of this, it is possible to read data "0" from the word line waveguide 52a and data "1" from the word line waveguide 52b. In this way, the cylindrical body 22a and the cylindrical body 22b are caused to operate as a storage element.

Next, the effect of the embodiment will be explained.

According to the embodiment, it is possible to configure the crosspoint integrated circuit 7 by a waveguide using near-field light. Due to this, it is possible to make finer the crosspoint integrated circuit 7.

(Eighth Embodiment)

Next, an eighth embodiment will be explained.

FIG. 20A is a block diagram illustrating an integrated circuit according to the eighth embodiment, FIG. 20B is a perspective view illustrating the integrated circuit according to the eight embodiment, and FIG. 20C is a cross-sectional view by A-A' shown in FIG. 20B.

As shown in FIGS. 20A to 20C, an integrated circuit 8 according to the embodiment, for example, a storage device, is provided with the word bit waveguide 52, the bit line waveguide 56, a plurality of p-n junctions 58, a switch 59, and the storage unit 55.

In the word line waveguide 52 and the bit line waveguide 56, a plurality of the air discs 13 are arrayed. The p-n junction 58 is obtained by joining, for example, p-type silicon 60 to which impurities serving as acceptors are added and n-type silicon 61 to which impurities serving as donors are added.

Between the word line waveguide 52 and the bit line waveguide 56, from the word line waveguide 52 side, the p-n junction 58, a switch 59a, the p-n junction 58, the storage unit 55, the p-n junction 58, a switch 59b, and the p-n junction 58 are connected in this order. The p-type silicon 60 side of the p-n junction 58 disposed between the word line waveguide 52 and the switch 59a is connected to the word line waveguide 52. The p-type silicon 60 side of the p-n junction 58 disposed between the switch 59a and the storage unit 55 is connected to the storage unit 55. Consequently, both ends of the switch 59a are connected to the n-type silicon 61 at the p-n junction 58.

The p-type silicon 60 side of the p-n junction 58 disposed between the storage unit 55 and the switch 59b is connected to the storage unit 55. The p-type silicon 60 side of the p-n junction 58 disposed between the switch 59b and the bit line waveguide 56 is connected to the bit line waveguide 56. Consequently, both ends of the switch 59b are connected to the n-type silicon 61 at the p-n junction 58.

In the switch 59a and the switch 59b, from the inside, the n-type silicon 61, the p-type silicon 60, a gate insulating film 62, and a gate electrode 63 are stacked concentrically, with the direction connecting the word line waveguide 52 and the bit line waveguide 56 as a center axis. The gate electrode 63 of the switch 59a is connected to the p-type silicon 60 in contact with the bit line waveguide 56, via wiring 64. The gate electrode 63 of the switch 59b is connected to the p-type silicon 60 in contact with the word line waveguide 52, via the wiring 64.

Next, the operation of the embodiment will be explained.

Figure 21A:
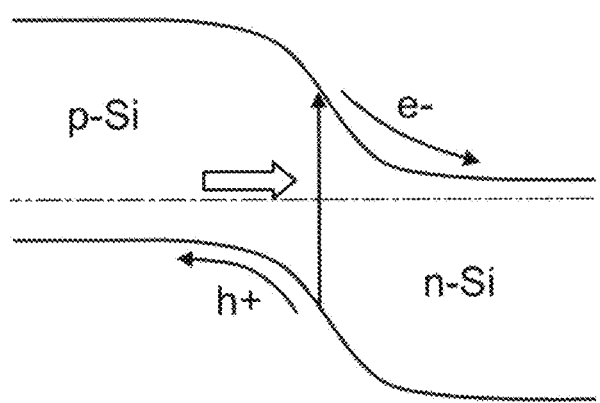
FIGS. 21A and 21B are diagrams illustrating a band diagram at a p-n junction.
Figure 21B:
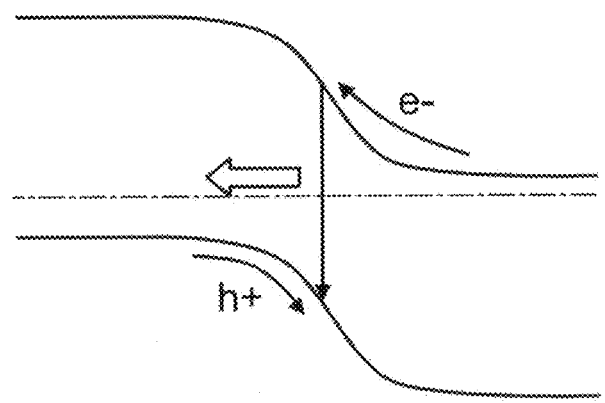

FIG. 21A is a diagram illustrating a band diagram at the p-n junction, in which light is converted into electrons in the integrated circuit according to the eighth embodiment and FIG. 21B is a diagram illustrating a band diagram at the p-n junction, in which electrons are converted into light in the integrated circuit according to the eighth embodiment.

For example, by performing irradiation with light of a light source including a laser diode (LD) or light emitting diode (LED), the near-field light generated at one end of the word line waveguide 52 and at one end of the bit line waveguide 56 is propagated to the other ends of the word line waveguide 52 and the bit line waveguide 56. Further, the junction 58 in contact with the word line waveguide 52 and the bit line waveguide 56 is irradiated with the near-field light. The p-n junction 58 converts the near-field light into electrons.

As shown in FIG. 21A, when the amount of received light is increased in the p-type silicon 60 having received the near-field light, the number of discharged electrons increases. When the number of discharged electrons increases, the difference in chemical potential displacement becomes large. The displaced potential is used as a signal. For example, the signal of the potential displaced at the p-n junction 58 in contact with the word line waveguide 52 is applied to the gate electrode 63 of the switch 59b, via the wiring 64. The signal of the potential displaced at the p-n junction 58 in contact with the bit line waveguide 56 is applied to the gate electrode 63 of the switch 59a, via the wiring 64. The switch 59 made up of the switch 59a and the switch 59b is caused to open only when the near-field light propagates from both the word line waveguide 52 and the bit line waveguide 56. The switch 59 is an electroabsorption type semiconductor switch, for example, an InGaAsP modulation switch.

As shown in FIG. 21B, by putting the switch 59a and the switch 59b into the ON state, electrons are injected to the p-n junction 58 in contact with both ends of the storage unit 55. By the injection of electrons, the p-n junction 58 emits light. When the number of injected electrons at the p-n junction 58 is increased, the amount of emitted light increases. In this way, both ends of the storage unit 55 are caused to be irradiated with light.

The storage unit 55 is caused to include, for example, a photochromic material whose state changes when irradiated with light. When the photochromic material is an organic material, it is possible to perform recording even if the amount of light is small.

When writing information, each of the bit line waveguide 56 and the word line waveguide 52 is irradiated with light having half the power density capable of changing the state of the photochromic material included in the storage unit 55. Due to this, the state of the photochromic material included in the storage unit 55 is caused to change. For example, it is specified that the state where the state of the photochromic material has changed is data "0" and the state where the state has not changed is data "1".

Then, when reading information, by performing irradiation with light whose power density has been reduced, the reflected light or transmitted light is measured. It is possible to read data "0" or data "1" from the state of the photochromic material included in the storage unit 55. In this way, the storage unit 55 is caused to operate as a storage element.

According to the embodiment, it is possible to configure the crosspoint integrated circuit 8 by a waveguide using near-filed light. Due to this, it is possible to make finer the crosspoint integrated circuit 8.

The p-n junction 58 may be pin junction in which an insulating film is inserted between the p-type silicon 60 and the n-type silicon 61.

In the storage unit 55, signals from both the word line waveguide 52 and the bit line waveguide 56 may be replaced with electronic signals, and each of the electronic signals may be switched by using a MOS transistor. After the signals are replaced with electronic signals, it may also be possible to be stored by an electronic memory structure.

As the storage unit 55, a phase-change material including the photon mode and heat mode may be used besides the photochromic material. In addition, a photoinduced phase transition material may be used. Furthermore, these materials may be inorganic materials or organic based molecules. As those corresponding to infrared, those using two-photon absorption or three-photon absorption may be used. As the photochromic material corresponding to infrared, those including a diarylethene compound may be used. When recording electronically, electrons are preserved in the floating gate of a flash memory or in the capacitor of a DRAM.

According to the embodiments as described above, it is possible to provide a waveguide and an integrated circuit which can be made finer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A waveguide comprising:
   a substrate; and
   a member covering at least a part of the substrate and having a difference in the refractive index from the substrate not less than 2,
   a plurality of concave parts being provided on the substrate, the concave parts being arrayed on an upper face of the substrate, at least a part of a side face of each of the concave parts being curved, an inner diameter of each of the concave parts being not more than 50 nm, and intervals of the neighboring concave parts being not more than the inner diameter, and the member filling the concave part.

2. The waveguide according to claim 1, wherein
   the substrate includes a semiconductor, and
   the member includes air.

3. The waveguide according to claim 2, wherein
   the semiconductor of the substrate is Si.

4. The waveguide according to claim 1, wherein
   a shape of the member is cylindrical.

5. The waveguide according to claim 1, wherein
   a shape of the member is spherical.

6. The waveguide according to claim 1, wherein
   the inner diameter is not more than 10 nm.

7. The waveguide according to claim 1, wherein
   a depth of the concave part is 0.1 to 50 nm.

8. The waveguide according to claim 2, wherein
   air filling the concave parts form air discs, and
   neighboring air discs are in contact.

9. The waveguide according to claim 1, wherein
   the array includes a portion extending in one direction and a portion extending in another direction intersecting with the one direction.

10. A waveguide comprising:
    a plurality of bodies, at least a part of a cross-section of each of the bodies being curved, the bodies being arrayed on a face parallel to the cross-section, a size of each of the bodies being not more than 50 nm, one of the bodies contacting another one of the bodies neighboring the one of the bodies and
    a member covering at least a part of each of the bodies and having a difference in the refractive index from the bodies not less than 2.

11. The waveguide according to claim 10, wherein the bodies include a semiconductor, and the member includes air.

12. The waveguide according to claim 10, wherein
    the bodies include an insulator, and
    the member includes metal.

13. The waveguide according to claim 10, wherein
    the bodies include metal, and
    the member includes an insulator.

14. The waveguide according to claim 10, wherein the size is not more than 10 nm.

15. The waveguide according to claim 11, wherein
    the semiconductor is Si.

16. The waveguide according to claim 13, wherein
    the insulator is a silicon oxide film.

17. The waveguide according to claim 10, wherein the member is provided on a substrate, the bodies are cylindrical, and a lower face of the bodies is in contact with the substrate.

18. The waveguide according to claim 13, wherein
    the metal includes at least one metal selected from a group consisting of gold, silver, copper, aluminum, and chromium.

19. The waveguide according to claim 13, wherein
    the insulator is a silicon film.

20. The waveguide according to claim 1, wherein the at least the part of the side face of each of the concave parts includes an arc.

21. The waveguide according to claim 10, wherein the at least the part of a cross-section of each of the bodies includes an arc.

22. The waveguide according to claim 10, wherein the bodies are cylindrical or spherical.

* * * * *